United States Patent
Orozco Santos Coy et al.

(10) Patent No.: US 11,362,357 B2
(45) Date of Patent: Jun. 14, 2022

(54) SYSTEM AND METHOD FOR GENERATING VIBRATIONS IN AT LEAST ONE COMPONENT OF A FUEL CELL SYSTEM, AND FUEL CELL SYSTEM

(71) Applicant: FORD GLOBAL TECHNOLOGIES, LLC, Dearborn, MI (US)

(72) Inventors: Julio Orozco Santos Coy, Aachen (DE); Rolf Lorenz Loeffler, Rommerskirchen (DE); Arnulf Sponheimer, Kornwestheim (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 240 days.

(21) Appl. No.: 16/794,790

(22) Filed: Feb. 19, 2020

(65) Prior Publication Data

US 2020/0287228 A1 Sep. 10, 2020

(30) Foreign Application Priority Data

Mar. 6, 2019 (DE) .................... 10 2019 203 050 U

(51) Int. Cl.
*H01M 8/04992* (2016.01)
*H01M 8/04111* (2016.01)
(Continued)

(52) U.S. Cl.
CPC ......... *H01M 8/04992* (2013.01); *B60L 50/72* (2019.02); *B60L 58/32* (2019.02);
(Continued)

(58) Field of Classification Search
CPC ........ B60L 50/72; B60L 58/31; B60L 568/32; B60L 58/34; H01M 2250/20;
(Continued)

(56) References Cited

U.S. PATENT DOCUMENTS 6,855,444 B2  2/2005  Morishima et al.
9,428,077 B2  8/2016  Staley et al.
(Continued)

FOREIGN PATENT DOCUMENTS

DE  102009006128 A1  1/2010
DE  102009006129 A1  1/2010
DE  102008046112 A1  3/2010

OTHER PUBLICATIONS

Waters, Dr. T. Aircraft de-icing using frequency vibration. Faculty of Engineering & the Envirnment. University of Southampton. Sep. 29, 2014. 2 pages.

*Primary Examiner* — Adam A Arciero
(74) *Attorney, Agent, or Firm* — Brooks Kushman PC; David Kelley

(57) ABSTRACT

A system and method for generating vibrations in a fuel cell system include a vibration device which can be arranged on the fuel cell system or is formed by at least one component of the fuel cell system, for generating excitation vibrations which can be transmitted to the component. An electronic actuating system includes a controller and memory for actuating the vibration device, which may include a coolant pump or a compressor, at a natural frequency of a fuel system component for de-icing. At temperatures below 0° C., the electronic actuating system is adapted to actuate the vibration device during a switch-on process and/or a switch-off process of the fuel cell system taking into consideration at least one natural frequency of the component. Embodiments including actuating a compressor, cooling pump, and/or valve to transmit vibrations to a component to be de-iced at a natural frequency of the component.

20 Claims, 2 Drawing Sheets

(51) Int. Cl.
*H01M 8/04029* (2016.01)
*H01M 8/04228* (2016.01)
*H01M 8/04225* (2016.01)
*H01M 8/04302* (2016.01)
*H01M 8/04746* (2016.01)
*H01M 8/04303* (2016.01)
*H01M 8/04082* (2016.01)
*B60L 58/32* (2019.01)
*B60L 50/72* (2019.01)
*H01M 8/04701* (2016.01)

(52) U.S. Cl.
CPC .... *H01M 8/04029* (2013.01); *H01M 8/04111* (2013.01); *H01M 8/04201* (2013.01); *H01M 8/04225* (2016.02); *H01M 8/04228* (2016.02); *H01M 8/04302* (2016.02); *H01M 8/04303* (2016.02); *H01M 8/04701* (2013.01); *H01M 8/04753* (2013.01); *H01M 2250/20* (2013.01)

(58) Field of Classification Search
CPC ......... H01M 8/04029; H01M 8/04074; H01M 8/04111; H01M 8/04201; H01M 8/04225; H01M 8/04228; H01M 8/04253; H01M 8/04302; H01M 8/04303; H01M 8/04701; H01M 8/04753; H01M 8/04992
See application file for complete search history.

(56) References Cited

U.S. PATENT DOCUMENTS

| | | | |
|---|---|---|---|
| 2002/0164511 A1* | 11/2002 | Uozumi | H01M 8/04485 429/429 |
| 2005/0238934 A1 | 10/2005 | Takahashi | |
| 2008/0121736 A1* | 5/2008 | Mao | F02M 31/18 239/102.2 |
| 2008/0241608 A1 | 10/2008 | Zhang et al. | |
| 2013/0095406 A1 | 4/2013 | Sutarwala et al. | |
| 2016/0181637 A1* | 6/2016 | Nanba | B60L 3/0053 429/444 |
| 2016/0380286 A1 | 12/2016 | Yamanaka et al. | |
| 2018/0342749 A1* | 11/2018 | Okamura | H01M 8/04253 |

\* cited by examiner

SYSTEM AND METHOD FOR GENERATING VIBRATIONS IN AT LEAST ONE COMPONENT OF A FUEL CELL SYSTEM, AND FUEL CELL SYSTEM

CROSS-REFERENCE TO RELATED APPLICATIONS

This application claims foreign priority benefits under 35 U.S.C. § 119(a)-(d) to DE Application 10 2019 203 050.5 filed Mar. 6, 2019, which is hereby incorporated by reference in its entirety.

TECHNICAL FIELD

The disclosure relates to a system and method for generating vibrations in at least one component of a fuel cell system to reduce or eliminate ice.

BACKGROUND

To start and operate a fuel cell system at temperatures below 0° C., fuel cell channels and fuel cell connections in particular should be free of ice blockades. Such ice blockades can lead at best to an interruption of a start-up process due to an under provision of hydrogen and/or an under provision of oxygen and at worst to damage to some or all of the fuel cells of the fuel cell system. Various measures have been proposed for preventing the formation of such ice blockades or breaking up the ice blockades.

US 2013/0095406 A1 discloses a method and a system for improving the efficiency of fuel cells by removing impediments within a fuel cell channel. The system comprises at least one sensor and a processor for determining when a concentration level of a gas, such as, for example, carbon dioxide, has exceeded a maximum threshold. The processor then activates an impediment removing element in order to remove or release gas bubbles within the fuel cell channel which are blocking reaction sites or fuel flow.

US 2016/0380286 A1 discloses a fuel cell system comprising a compressor that is placed in a supply flow path arranged to supply a cathode gas to a fuel cell, a first motor-operated valve that is placed between the fuel cell and the compressor in the supply flow path, a first stepping motor that is provided in the first motor-operated valve, a second motor-operated valve that is placed in a discharge flow path arranged to discharge the cathode gas from the fuel cell, a second stepping motor that is provided in the second motor-operated valve, and a controller that is configured to control power generation by the fuel cell and to input drive pulses into the first stepping motor and the second stepping motor, so as to open the first motor-operated valve and the second motor-operated valve at a start of the fuel cell and close the first motor-operated valve and the second motor-operated valve at a stop of the fuel cell. The first stepping motor is operated by the input of the drive pulses to generate a torque to open and close the first motor-operated valve. The second stepping motor is operated by the input of the drive pulses to generate a torque to open and close the second motor-operated valve. The controller determines whether at least one of the first motor-operated valve and the second motor-operated valve is in a frozen state at the start of the fuel cell. When it is determined that neither the first motor-operated valve nor the second motor-operated valve is in the frozen state, the controller starts power generation by the fuel cell. When it is determined that at least one of the first motor-operated valve and the second motor-operated valve is in the frozen state, the controller performs a predefined process that repeats, a multiple number of times, alternately inputting a first drive pulse that generates a torque in a direction of increasing a valve opening and a second drive pulse that has a higher pulse speed than a pulse speed of the first drive pulse and generates a torque in a direction of decreasing the valve opening, to a stepping motor provided in at least the motor-operated valve in the frozen state out of the first stepping motor and the second stepping motor.

U.S. Pat. No. 6,855,444 B2 discloses a fuel cell system which comprises a fuel cell which generates electrical energy by a chemical reaction between hydrogen and oxygen. The fuel cell system comprises an outside air temperature detection means for detecting the outside air temperature in the vicinity of the fuel cell, an outside air temperature estimation means for estimating, after deactivation of the fuel cell, the fall in the outside air temperature on the basis of a change in the outside air temperature detected by the outside air temperature detection means, a freezing decision means for making a decision as to whether or not the estimated outside air temperature obtained by the outside air temperature estimation means is below a previously determined freezing temperature at which moisture freezes, and a freezing prevention processing means for preventing moisture inside the fuel cell from freezing when the freezing decision means has decided that the outside air temperature is below the previously determined freezing temperature.

US 2005/0238934 A1 discloses a fuel cell plant having a fuel cell stack which consists of a plurality of fuel cells which perform electric power generation by means of a reaction of hydrogen and oxygen. A controller determines whether or not moisture inside the fuel cell stack is frozen. If the moisture is frozen, the controller causes the fuel cell stack to perform intermittent electric power generation via an inverter, while oxygen continues to be delivered to the fuel cell stack. As a result of the generation of electric power, the fuel cell stack generates heat, whereby moisture is generated in a cathode. During periods in which electric power generation is not being performed, the oxygen which is supplied to the cathode of the fuel cells scavenges the generated moisture, thereby ensuring the supply of oxygen to the cathode during electric power generation.

US 2008/0241608 A1 discloses a method for operating a fuel cell stack, wherein the fuel cell stack, which has a temperature below 0° C., is started and a load is applied to the fuel cell which ranges from 75 percent of the maximum to the maximum load to which the fuel cell stack is capable of responding, wherein the maximum load is limited by fuel cell system constraints and wherein the applied load is greater than the load required by the operator for operating primary and auxiliary devices. Application of the load is continued with an amount which is greater than that required by the operator, at least until the temperature of the fuel cell stack is above 0° C.

U.S. Pat. No. 9,428,077 B2 discloses a vehicle having a fuel cell system which comprises a fuel cell stack for generating power and a controller which is so designed that it receives a first signal which is indicative of a predicted ambient temperature at a specified location and commands the fuel cell system to operate at a reduced relative humidity in the fuel cell stack when the predicted ambient temperature is below a threshold value.

The publication available under the link http://gow.epsrc.ac.uk/NGBOViewGrant.aspx?GrantRef=EP/M005321/1 discloses a method for de-icing aircraft wings using vibrations.

SUMMARY

Various embodiments according to the disclosure may improve operation, in particular a start-up operation or a shut-down operation, of a fuel cell system at temperatures below 0° C.

According to one or more embodiments, an electronic actuating system is adapted to actuate a vibration device during a switch-on process and/or a switch-off process of the fuel cell system taking into consideration at least one natural frequency of a component of the fuel cell system.

It should be pointed out that the features and measures mentioned individually in the following description can be combined with one another in any technically expedient manner and indicate further embodiments that may not be explicitly described or illustrated. The description additionally characterizes and specifies the representative embodiments in particular in connection with the figures.

According to one or more embodiments, vibrations can be generated at the component of the fuel cell system, for example at a fuel cell stack of the fuel cell system, by means of the vibration device during the switch-on process, that is to say during a process of starting operation, taking into consideration at least one natural frequency of the component, whereby any ice deposits on the component can be removed from the component reliably and quickly, so that normal operation of the fuel cell system can subsequently be ensured. For this purpose, the electronic actuating system can actuate or activate the vibration device to generate excitation vibrations, for example, within a time interval of a predetermined length that temporally immediately follows a start of operation, which excitation vibrations are transmitted indirectly or directly to the component of the fuel cell system that is to be de-iced. The length of the time interval can depend on an ambient temperature and/or a system temperature. The length of the time interval is preferably so chosen that the excitation vibrations are generated until the fuel cell system is capable of delivering electric power. The length of the time interval can be between 10 s and 300 s. The at least one natural frequency of the component that is to be de-iced can be determined and stored in a non-transient memory of the electronic actuating system beforehand. For example, a natural frequency for the fuel cell stack may be empirically determined or estimated based on its mass and stiffness as installed in the vehicle with the corresponding natural frequency stored in a memory of the electronic actuating system to actuate or activate the cooling system pump, compressor, or other vibration device at the previously stored frequency for more effective de-icing of the component during start-up or elimination of condensation droplets during shut-down.

Alternatively or in addition, vibrations can be generated at the component of the fuel cell system by means of the vibration device during the switch-off process, that is to say during a process of ending operation, taking into consideration at least one natural frequency of the component, whereby condensation water can reliably be prevented from remaining, when the fuel cell system is switched off, on the component, for example in a passage, a channel, a feed connection and/or discharge connection for water, air or hydrogen, and possibly forming drops which, in the switched-off state of the fuel cell system, can form an ice deposit on the component. For this purpose, the electronic actuating system can actuate or activate the vibration device to generate excitation vibrations, for example, within a time interval that temporally immediately precedes an end of operation, which excitation vibrations are transmitted indirectly or directly to the component of the fuel cell system that is to be de-iced. The length of the time interval can depend on an ambient temperature, ambient humidity, system temperature, system humidity, for example fuel cell stack humidity, and/or system operating time. The length of the time interval can be between 10 s and 120 s. The fuel cell system can thereby optimally be prepared to a certain extent for the next switch-on process, so that at best no de-icing of the component of the fuel cell system has to be carried out. The at least one natural frequency of the component of the fuel cell system can be determined and stored in the electronic actuating system beforehand.

The system according to one or more embodiments, or the vibration device thereof, can also be adapted to generate vibrations at two or more, in particular at all, of the components of the fuel cell system. The vibration device can thereby comprise at least one vibration unit which has been produced separately from the fuel cell system and can be arranged or has been arranged on the fuel cell system. Alternatively, the vibration device can be formed in part or completely by at least one component of the fuel cell system. The excitation vibrations which can be generated by the vibration device are generated taking into consideration the at least one natural frequency of the component of the fuel system in that the electronic actuating system actuates the vibration device accordingly. The electronic actuating system can thereby be in the form of a separate unit or realized, for example, by an electronic vehicle control system of a vehicle.

According to an advantageous embodiment, the vibration device which can be arranged on the fuel cell system comprises at least one electrically actuatable actuator which is arranged at least indirectly on a housing of the fuel cell system which receives at least one fuel cell, or on a component of a holding structure of the fuel cell system which does not form a housing, or on an individual fuel cell of the fuel cell system. The vibration device is accordingly arranged as a separate component on the fuel cell system. The vibration device can also comprise two or more electrically actuatable actuators which are arranged at different locations of the fuel cell system and can be actuated by the electronic actuating system. The component of the holding structure can be, for example, an end plate lying against a fuel cell stack of the fuel cell system, a tensioning strap bracing the cells of the fuel cell stack against one another, or the like. The actuator can, for example, comprise at least one piezo element or be in the form of an electric motor.

A further advantageous embodiment provides that the actuator comprises a shaft or is in shaftless form or comprises at least one piezo motor. By means of an actuator having a shaft and a shaftless actuator, vibrations with a frequency in a low or middle range, for example, can be generated. By means of a piezo motor, vibrations with a frequency in a high range can be generated.

According to a further advantageous embodiment, the vibration device is adapted to generate sound waves or ultrasonic waves. For this purpose, the vibration device can comprise, for example, at least one piezo motor, in particular piezo excimer.

According to a further advantageous embodiment, the vibration device is formed at least in part by at least one valve of a cathode gas system or of a hydrogen system or of a cooling system of the fuel cell system, wherein the electronic actuating system is adapted to switch the valve to and fro during the switch-on process and/or the switch-off process with a predetermined frequency between an open state, in which the valve is partially or completely open, and a closed state, which is different from the open state, in which the valve is less open than in the open state. By the switching of the respective valve to and fro, the valve generates excitation vibrations which can be transmitted in particular mechanically to the component of the fuel cell system, wherein the component can also be the valve itself. Two valves, in particular throttle valves, of the cathode gas system, with which a cathode gas, in particular air or oxygen, can be fed to the fuel cells of the fuel cell system, can also be correspondingly switched. The valve of the hydrogen system, with which the fuel cells of the fuel cell system can be supplied with hydrogen, can be formed, for example, as a low-pressure valve in a hydrogen feed line of the hydrogen system which feeds hydrogen to the fuel cells, or as an outlet valve in a hydrogen discharge line of the hydrogen system which discharges hydrogen from the fuel cells. The valve of the cooling system, by which the fuel cells of the fuel cell system can be cooled during operation, can be arranged, for example, in a feed line of the cooling system which opens in the fuel cell stack. Switching of the respective valve can take place, for example, via PWM actuation of the valve.

A further advantageous embodiment provides that the electronic actuating system can be connected or is connected to an air compressor of the cathode gas system and/or to a pump of the cooling system of the fuel cell system, wherein the electronic actuating system is adapted to operate the air compressor and/or the pump at a predetermined speed during the switch-on process and/or the switch-off process. By means of the air compressor of the cathode gas system, air can be guided through the fuel cell stack of the fuel cell system during the switch-on process and/or the switch-off process, in order to discharge moisture from the fuel cell stack to a certain extent, which in particular prevents the formation of ice blockades of condensation water on the component of the fuel cell system. In addition, the air compressor can be operated at a speed with which a natural vibration of the component of the fuel cell system is excited. The pump of the cooling system can be operated during the switch-on process and/or the switch-off process, for example, at a speed with which a natural vibration of the component of the fuel cell system is excited.

In one or more embodiments, a fuel cell system comprises at least one system according to one of the above-mentioned embodiments or a combination of at least two of those embodiments with one another.

The advantages mentioned above in relation to the system are correspondingly associated with the fuel cell system. The system can be used, for example, in a vehicle, for example in a land vehicle, in particular in a passenger car, in a watercraft or in an aircraft. Alternatively, the system can be used in a stationary application. The fuel cell system can, for example, generate electric power which can be fed to an electrical energy store of a vehicle, with which, for example, electric drive motors of the vehicle can be supplied.

In one or more embodiments, a method generates vibrations during a switch-on process and/or a switch-off process of the fuel cell system taking into consideration at least one natural frequency of the component.

The advantages mentioned above in relation to the system are correspondingly associated with the method. In particular, the system according to one of the above-mentioned embodiments or a combination of at least two of those embodiments with one another can be used to carry out the method.

According to an advantageous embodiment, a valve of a cathode gas system or of a hydrogen system or of a cooling system of the fuel cell system is switched to and fro during the switch-on process and/or the switch-off process with a predetermined frequency between an open state, in which the valve is partially or completely open, and a closed state, which is different from the open state, in which the valve is less open than in the open state. The advantages mentioned above in relation to the corresponding embodiment of the system are correspondingly associated with this embodiment.

A further advantageous embodiment provides that an air compressor of the cathode gas system and/or a pump of the cooling system of the fuel cell system are operated at a predetermined speed during the switch-on process and/or the switch-off process. The advantages mentioned above in relation to the corresponding embodiment of the system are correspondingly associated with this embodiment.

DETAILED DESCRIPTION

Figure 1:
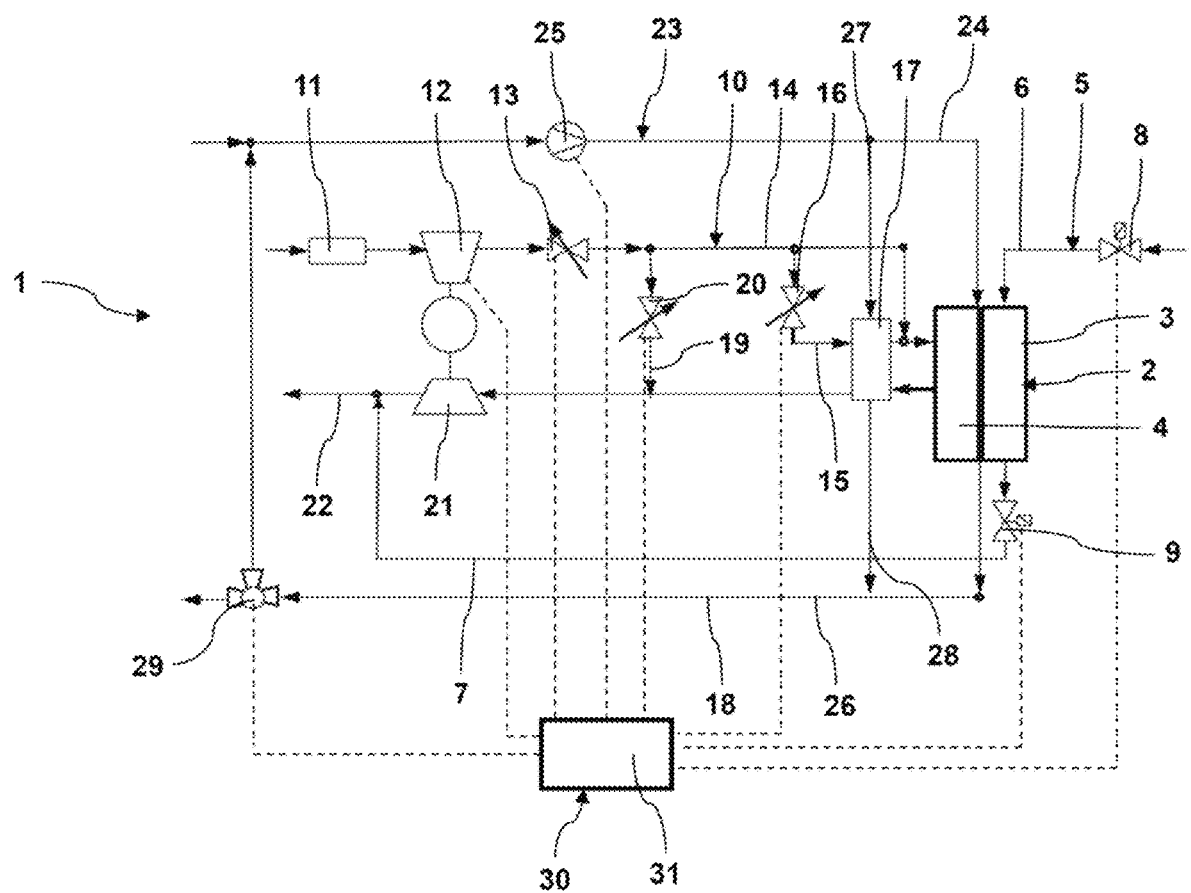
FIG. 1 is a block diagram illustrating representative embodiments of a fuel cell system according to the disclosure.

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

In the various figures, identical parts are always provided with the same reference numerals, for which reason such parts are generally also only described once.

FIG. 1 is a block diagram illustrating representative embodiments of a fuel cell operating method or system 1 according to the disclosure. The fuel cell method or system 1 comprises a fuel cell stack 2 having a plurality of fuel cells (FIG. 2), a stack anode 3 and a stack cathode 4. The fuel cell system 1 further comprises a hydrogen system 5 having a hydrogen feed line 6 for feeding hydrogen to the stack anode 3, and a hydrogen discharge line 7 for discharging hydrogen from the stack anode 3. An electrically actuatable valve 8 of the hydrogen system 5 is arranged in the hydrogen feed line 6, and an electrically actuatable valve 9 of the hydrogen system 5 is arranged in the hydrogen discharge line 7.

The fuel cell system 1 additionally comprises a cathode gas system 10, with which the stack cathode 4 can be supplied with air, or oxygen contained therein. The cathode gas system 10 comprises an air inlet via which air is drawn in and fed to an air filter 11 of the cathode gas system 10. The air filtered by the air filter 11 is then fed to an air compressor 12 of the cathode gas system 10, which compresses the air and may be operated based on a predetermined stored frequency corresponding to a natural frequency of one or more components, such as the fuel cell stack 2. For example, the component may be operated at the natural frequency, or a multiple (harmonic) of the natural frequency to excite resonance in the desired component(s) to enhance de-icing or removal of condensation droplets. Downstream of the air compressor 12 there is arranged an actuatable stop valve 13. When the stop valve 13 is open, the compressed air can be fed directly to the stack cathode 4 via an air feed line 14. Stop valve 13 may be actuated in an oscillating mode at a natural frequency of one or more components during start-up or shut-down to provide de-icing as described herein.

In one or more embodiments, an electronic actuating system 31 is connected to air compressor 12 of the cathode gas system and is configured, programmed, or otherwise adapted to operate the air compressor at a predetermined speed or frequency during the switch-on process and/or the switch-off process. By means of the air compressor 12 of the cathode gas system, air can be guided through the fuel cell stack 2 of the fuel cell system 1 during the switch-on process and/or the switch-off process, in order to discharge moisture from the fuel cell stack 2 to a certain extent, which in particular prevents the formation of ice blockades of condensation water on the components of the fuel cell system. In addition, the air compressor 12 can be operated at a speed with which a natural vibration of the component of the fuel cell system is excited, i.e. at the natural frequency of one or more of the components. As generally understood by those of ordinary skill in the art, the natural frequency may be estimated based on mass and stiffness of the one or more components or empirically determined by observation or measurement and stored in a non-transitory computer readable memory or medium for use in controlling one or more vibration devices to provide vibrations at the natural or resonant frequency for de-icing or elimination of condensation. Similarly, the pump 25 of the cooling system can be operated during the switch-on process and/or the switch-off process, for example, at a speed with which a natural frequency of vibration or resonant frequency of the component of the fuel cell system is excited.

A moistening bypass line 15 branches from the air feed line 14, in which moistening bypass line there is arranged an actuatable stop valve 16. When the stop valve 16 is open, the compressed air is fed to a moistening unit 17 for moistening the compressed air, wherein the compressed air moistened by the moistening unit 17 is fed to the stack cathode 4. The moisture fed to the stack cathode 4 can thus be adjusted by actuation of the stop valve 16. The air flowing out of the stack cathode 4 is fed to the moistening unit 17 and discharged therefrom by means of an air discharge line 18.

An air bypass line 19 further branches from the air feed line 14, in which air bypass line there is arranged an actuatable stop valve 20 and which is connected to the air discharge line 18. By actuation of the stop valve 20, an air volume flow fed to the stack cathode 4 can be adjusted.

With the air discharge line 18, the air coming from the stack cathode 4 is fed to a turbine 21, from where the air is blown off via an air outlet line 22 after it has performed work in the turbine 21. The turbine 21 is connected mechanically and in a driving manner to the air compressor 12, so that the air compressor 12 can be driven by the turbine 21. The hydrogen discharge line 7 opens in the air outlet line 22.

The fuel cell system 1 further comprises a cooling system 23 for cooling the fuel cell stack 2. The cooling system 23 comprises a coolant feed line 24 which is connected on the feed side to a cooler (not shown) and in which a pump 25 is arranged. The coolant feed line 24 feeds a coolant, for example a water mixture, to the fuel cell stack 2. After passing through the fuel cell stack 2, the coolant is discharged from the fuel cell stack 2 by means of a coolant discharge line 26. The moistening unit 17 is connected on the input side via a feed line 27 to the coolant feed line 24 and via a discharge line 28 to the coolant discharge line 26, in order to be able to moisten the air fed to the moistening unit 17 with the coolant. A switch valve 29 is arranged in the coolant discharge line 26, so that the coolant coming from the fuel cell stack 2 is fed via the actuatable switch valve 29 either to the cooler or to the coolant feed line 24.

The fuel cell system 1 further comprises a system 30 for generating vibrations in at least one component (including those shown as well as other components not shown) of the fuel cell system 1. The system 30 comprises a vibration device formed by a component (shown or not shown) of the fuel cell system 1, for generating excitation vibrations which can be transmitted to the component. The component can be, for example, any component of the fuel cell system 1 shown in FIG. 1.

Alternatively or in addition, the system 30 can comprise at least one vibration device (FIG. 2) which can be arranged on the fuel cell system 1 and which can comprise at least one electrically actuatable actuator which can be arranged at least indirectly on a housing of the fuel cell system 1 which receives at least two fuel cells, or on a component of a holding structure of the fuel cell system 1 which does not form a housing, or on an individual fuel cell of the fuel cell system 1. The actuator can comprise a shaft or be in shaftless form or comprise at least one piezo motor. The vibration device can be adapted to generate sound waves or ultrasonic waves.

In the embodiments shown, the vibration device can be formed at least in part by the valve 13, 16 and/or 20 of the cathode gas system 10 and/or by the valve 8 and/or 9 of the hydrogen system 5 and/or by the valve 29 of the cooling system 23 of the fuel cell system 1.

The system 30 comprises an electronic actuating system 31 for actuating the vibration device. The electronic actuating system 31 may be implemented by a programmed microprocessor or microcontroller performing or executing an algorithm, program, or coding adapted to actuate the vibration device during a switch-on process and/or a switch-off process of the vehicle and/or fuel cell system 1 taking into consideration at least one natural frequency of the component that may be stored in an associated non-transitory memory. In particular, the electronic actuating system 31 is adapted to oscillate or switch the valve 8, 9, 13, 16, 20 and/or 29 to and fro during the switch-on process and/or the switch-off process with a predetermined frequency between an open state, in which the valve 8, 9, 13, 16, 20 and/or 29 is partially or completely open, and a closed state, which is different from the open state, in which the valve 8, 9, 13, 16, 20 and/or 29 is less open than in the open state.

It is additionally possible for the electronic actuating system controller 31 to be capable of being connected and/or to be connected to the air compressor 12 of the cathode gas system 10 and/or to the pump 25 of the cooling system 23 of the fuel cell system 1, wherein the electronic actuating system 31 can be adapted to operate the air compressor 12 and/or the pump 25 at a predetermined speed during the switch-on process and/or the switch-off process, wherein the predetermined speed corresponds to the determined natural frequency.

Figure 2:
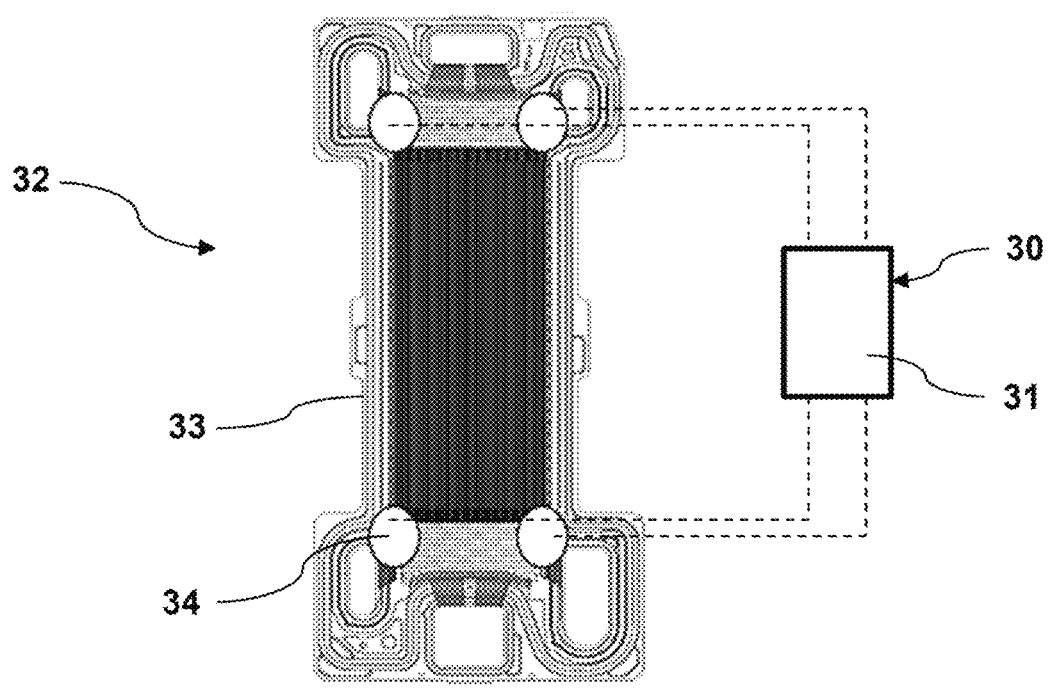
FIG. 2 is a schematic representation illustrating an example of one of the embodiments of FIG. 1 with a vibration device associated with a fuel cell housing according to the disclosure.

FIG. 2 is a schematic representation of an exemplary implementation for one of the embodiments illustrated in FIG. 1 of a fuel cell system 32. A fuel cell stack housing 33 is shown, in which a plurality of fuel cells are arranged. Arranged on the fuel cell stack housing 33 are four vibration devices 34 in the form of shaftless actuators which can be actuated by means of the electronic actuating system 31 to generate vibrations at least at the fuel cell housing 33. Shaftless actuators may be implemented by piezo devices, for example.

Moreover, the fuel cell system 32 can be configured according to the exemplary embodiment shown in FIG. 1, for which reason, in order to avoid repetition, reference is made to the above description relating to FIG. 1.

According to one or more embodiments, vibrations can be generated at the component of the fuel cell system, for example at a fuel cell stack 2 of the fuel cell system 1, by means of the vibration device during the switch-on process, that is to say during a process of starting operation, taking into consideration at least one natural frequency of the component, whereby any ice deposits on the component can be removed from the component reliably and quickly, so that normal operation of the fuel cell system 1 can subsequently be ensured. For this purpose, the electronic actuating system 31 can actuate or activate the vibration device to generate excitation vibrations, for example, within a time interval of a predetermined length that temporally immediately follows a start of operation, which excitation vibrations are transmitted indirectly or directly to the component of the fuel cell system 1 that is to be de-iced. The length of the time interval can depend on an ambient temperature and/or a system temperature. The length of the time interval is preferably so chosen that the excitation vibrations are generated until the fuel cell system 1 is capable of delivering electric power. The length of the time interval can be between 10 seconds and 300 seconds, for example. The at least one natural frequency of the component that is to be de-iced can be estimated or empirically determined and stored in the electronic actuating system memory beforehand.

Alternatively or in addition, vibrations can be generated at the component of the fuel cell system 1 by means of the vibration device during the switch-off process, that is to say during a process of ending operation, taking into consideration at least one natural frequency of the component, whereby condensation water can reliably be prevented from remaining, when the fuel cell system 1 is switched off, on the component, for example in a passage, a channel, a feed connection and/or discharge connection for water, air or hydrogen, and possibly forming drops which, in the switched-off state of the fuel cell system, can form an ice deposit on the component. For this purpose, the electronic actuating system 31 can actuate or activate the vibration device to generate excitation vibrations, for example, within a time interval that temporally immediately precedes an end of operation, which excitation vibrations are transmitted indirectly or directly to the component of the fuel cell system 1 that is to be de-iced. The length of the time interval can depend on an ambient temperature, ambient humidity, system temperature, system humidity, for example fuel cell stack 2 humidity, and/or system operating time. The length of the time interval can be between 10 seconds and 120 seconds, for example. The fuel cell system 1 can thereby optimally be prepared to a certain extent for the next switch-on process, so that at best no de-icing of the component of the fuel cell system has to be carried out. The at least one natural frequency of the component of the fuel cell system can be estimated or empirically determined and stored in a memory of the electronic actuating system 31 beforehand.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments that may not be explicitly illustrated or described.

What is claimed is:

1. A vehicle comprising:
   a fuel cell stack having a plurality of fuel cells, a stack anode, and a stack cathode disposed within a housing;
   an electronically actuatable feed valve configured to control flow of hydrogen from a feed line to the stack anode;
   an electronically actuatable discharge valve configured to control flow of hydrogen from the stack anode through a discharge line;
   a compressor configured to provide compressed air through at least one electronically actuatable air supply valve to the stack cathode via an air feed line;
   a coolant pump configured to supply coolant to the fuel cell stack, the coolant flow controlled by an electronically actuatable coolant discharge switch valve; and
   a controller having an associated memory containing a stored value corresponding to a natural frequency of at least one component of the fuel cell stack and programmed to operate at least one of the electronically actuatable feed valve, discharge valve, coolant discharge switch valve, the at least one air supply valve, the compressor, and the coolant pump based on the natural frequency of the at least one component of the fuel cell stack for a specified period of time in response to at least one of a vehicle switch-on request and a vehicle switch-off request.

2. The vehicle of claim 1 wherein the specified period of time corresponds to at least one of an ambient temperature and temperature of at least one vehicle component.

3. The vehicle of claim 2 wherein the specified period of time is longer in response to the vehicle start-up request than in response to the vehicle shut-down request for a particular temperature.

4. The vehicle of claim 1 wherein the natural frequency of the at least one component of the fuel cell stack is empirically determined.

5. The vehicle of claim 1 further comprising at least one electronically actuatable vibration device in contact with the housing, wherein the controller is programmed to operate the at least one electronically actuatable vibration device at the natural frequency during the specified period of time.

6. The vehicle of claim 5 wherein the vibration device comprises a shaftless piezo motor.

7. The vehicle of claim 5 wherein the vibration device is adapted to generate sound waves or ultrasonic waves.

8. The vehicle of claim 1 wherein the specified period of time in response to the switch-off request is based on ambient temperature, ambient humidity, system temperature, system humidity and/or vehicle operating time.

9. The vehicle of claim 8 wherein the specified period of time is between 10 seconds and 120 seconds.

10. A vehicle comprising:
    a fuel cell stack having a plurality of fuel cells, a stack anode, and a stack cathode disposed within a housing;
    at least one electronically actuatable vibration device configured to vibrate the fuel cell stack; and
    a controller having an associated memory containing a stored value corresponding to a natural frequency of at least one component of the fuel cell stack and programmed to operate the at least one electronically actuatable vibration device to generate vibrations in the fuel cell stack based on the natural frequency for a specified period of time in response to at least one of a vehicle switch-on request and a vehicle switch-off request, the specified period of time varying based on at least one of ambient temperature, ambient humidity, fuel cell stack temperature, and fuel cell stack humidity.

11. The vehicle of claim 10 wherein the at least one electronically actuatable vibration device is adapted to generate sound waves or ultrasonic waves.

12. The vehicle of claim 10 wherein the at least one electronically actuatable vibration device comprises a shaftless piezo motor.

13. The vehicle of claim 10 wherein the at least one electronically actuatable vibration device comprises a compressor configured to supply compressed air to the fuel cell stack.

14. The vehicle of claim 10 wherein the at least one electronically actuatable vibration device comprises a coolant pump configured to supply coolant to the fuel cell stack.

15. The vehicle of claim 10 wherein the at least one electronically actuatable vibration device comprises at least one valve associated with the fuel cell stack.

16. The vehicle of claim 10 wherein the at least one electronically actuatable vibration device is in contact with a housing of the fuel cell stack.

17. A method for operating a vehicle having a fuel cell stack including a plurality of fuel cells, a compressor configured to supply compressed air to the fuel cell stack, a coolant pump configured to supply coolant to the fuel cell stack, and at least one valve controlling flow of the compressed air and at least one valve controlling flow of the coolant, the method comprising, by a vehicle controller:

controlling an electronically actuatable vibration device to operate at a frequency based on a previously stored value for a natural frequency of the fuel cell stack for a specified time after a vehicle switch-on request or a vehicle switch-off request, the vibration device configured to vibrate at least one component of the fuel cell stack at the natural frequency.

18. The method of 17 wherein the vibration device comprises at least one of the compressor, the coolant pump, the at least one valve controlling flow of the compressed air, and the at least one valve controlling flow of the coolant.

19. The method of claim 17 wherein the vibration device comprises a shaftless piezo motor.

20. The method of claim 17 wherein the specified time is based on at least one of ambient temperature, ambient humidity, fuel cell stack temperature, and fuel cell stack humidity.

* * * * *